(12) United States Patent
Brockman et al.

(10) Patent No.: US 6,546,085 B1
(45) Date of Patent: Apr. 8, 2003

(54) SYSTEM AND METHOD TO ENABLE A CALLING PARTY TO VERIFY DELIVERY AND TO CANCEL STORED FACSIMILES

(75) Inventors: Richard James Brockman, Naperville, IL (US); Phillip Michael Sands, Champaign, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/430,510

(22) Filed: Oct. 29, 1999

(51) Int. Cl.[7] .................................................. H04M 1/64
(52) U.S. Cl. ................ 379/88.13; 379/67.1; 379/88.19; 379/88.23; 379/100.01; 379/88.12
(58) Field of Search ...................... 379/67.1, 74, 88.12, 379/88.13, 100.01, 88.04, 88.19, 88.2, 88.21, 88.22, 88.23, 88.24

(56) References Cited

U.S. PATENT DOCUMENTS

| 5,333,266 A | * | 7/1994 | Boaz et al. ................. 395/200 |
| 5,349,636 A | * | 9/1994 | Irribaren ................... 379/88.15 |
| 5,452,099 A | * | 9/1995 | Von Meister ................ 358/403 |
| 5,559,611 A | * | 9/1996 | Bloomfield et al. ........ 358/407 |
| 5,742,905 A | * | 4/1998 | Pepe et al. .................. 455/461 |
| 5,870,549 A | * | 2/1999 | Bobo, II ................. 395/200.36 |
| 5,877,746 A | * | 3/1999 | Parks et al. .................. 345/156 |

* cited by examiner

*Primary Examiner*—Allan Hoosain

(57) ABSTRACT

A system and method that enables a calling party to verify delivery and/or cancel stored facsimiles. This advance is achieved by a voice mail system that receives incoming telephone calls and compares an incoming caller ID with caller ID's stored in conjunction with previous faxes. If a caller ID of the incoming call matches a caller ID in the database, (i.e., the calling party has previously left a fax) then the calling party is presented with a menu of options. The menu may include determining whether the called party has accessed the voice mail system but did not print or delete the fax message, and if the fax has not already been deleted, the calling party may delete the fax.

7 Claims, 2 Drawing Sheets

SYSTEM AND METHOD TO ENABLE A CALLING PARTY TO VERIFY DELIVERY AND TO CANCEL STORED FACSIMILES

FIELD OF THE INVENTION

This invention relates to the field of facsimile storage, and, more specifically, to the area of enhancing calling party control of stored facsimiles.

BACKGROUND OF THE INVENTION

Many voice mail systems, such as the Audix Voice Mail System manufactured by Lucent Technologies, have the capability of storing a facsimile (herein "fax") for later retrieval by the called party. In the current art, the called party can retrieve the fax by calling the voice mail system's access number from a fax machine or other device connected to a printer.

There are, however, many times when the person who sent the fax in the first place needs to know whether the fax has been received and/or needs to stop the fax from being delivered; for example, a calculation may be wrong in a fax that was sent to a number of destinations. If the correct information is available, the user would determine whether the called party had received the fax and, if not, delete the previous fax and send the new information.

SUMMARY OF THE INVENTION

This problem is solved and a technical advance is achieved in the art by a system and method that enables the calling party to verify delivery and/or cancel delivery of stored facsimiles. This advance is achieved by a voice mail system that receives incoming telephone calls and compares an incoming caller ID with caller ID's stored in conjunction with previous faxes. If a caller ID of the incoming call matches a caller ID in the database, (i.e., the calling party has previously left a fax) then the calling party is presented with a menu of options. The menu may include determining whether the called party is aware of the fax (accessed the voice mail system) but did not print or delete the fax message, and if the fax has not already been deleted, the calling party may delete the fax. In this manner, a user can change or modify a previously delivered fax and determine whether the fax has been received by the calling party thus providing more flexible interface for storing and delivering facsimiles.

BRIEF DESCRIPTION OF THE DRAWING

A more complete understanding of the invention may be obtained from the following description taken in conjunction with the drawings, in which.

DETAILED DESCRIPTION

Figure 1:
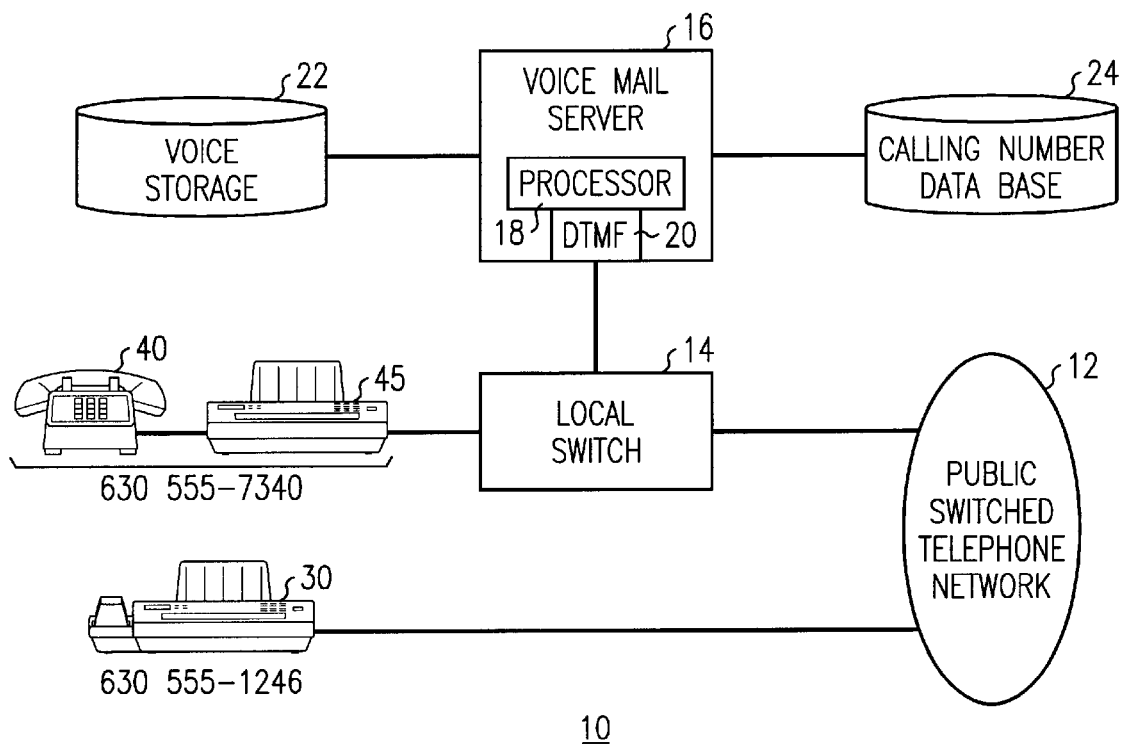
FIG. 1 is a block diagram of a telephone network in which an exemplary embodiment of this invention may operate.

FIG. 1 is a block diagram of a telephone network 10 in which an exemplary embodiment of this invention is implemented. Telephone network 10 comprises a public-switched telephone network (PSTN) 12, which consists of telephone switching systems, local and long distance networks, etc. as is known in the art. For purposes of explaining this invention, a local telephone switch (local switch) 14 is connected to the PSTN 12. In order to provide a telephone answering service to its customers, the local switch 14 is connected to a voice mail server 16.

Voice mail server 16 includes a processor 18, which controls the operation of voice mail server 16. A dual-tone, multifrequency (DTMF) detector is also connected in the audio path through voice mail server 16. Voice mail server 16 includes a recording and storage device 22 for storing outgoing voice prompts, incoming messages and fax messages as is known in the art. Voice mail server 16 also includes a storage device 24 containing calling number identifications associated with messages and fax stored in voice storage system 22. Telephone network 12 provides telephony services to fax machines 40 and 45.

According to an exemplary embodiment of this invention, fax machine 45 subscribes to voice mail service. Fax machine 30 is assigned the directory number 630-555-1246 and fax machine 45 is assigned the directory number 630-555-7340. When the user of fax machine 30 dials 630-555-7340, the call is forwarded through PSTN 12 to local switch 14. The calling line ID "630-555-1246" is also forwarded through the PSTN 12 to local switch 14. Local switch 14 applies a ringing signal to telephone 40. After a predetermined number of rings, or, if a busy signal is received, local switch 14 forwards the call to voice mail server 16. The calling line ID of fax machine 30 is also forwarded to voice mail server 16.

The processor 18 of voice mail server 16 compares the calling line ID (630-555-1246) to calling line ID's stored in calling number database 24 for this destination (fax machine 45). If the calling line ID (630-555-1246) is in the database 24, then a fax was previously left from the calling party at fax machine 30 for the called party fax machine 45. A menu of options is presented from voice storage 22 to the calling party at fax machine 30. The options may include determining whether one or more faxes have been retrieved by the called party at fax machine 45 and/or deleting one or more previously stored fax messages. The calling party at fax machine 30 signals to voice mail server 16 his or her choice through DTMF signaling, as is known in the art, which is translated at DTMF detector 20. Processor 18 receives the choice of the calling party from DTMF detector 20 and effects the desired operation. In this manner, a service that is not previously available, checking whether a call has been answered and the ability to delete previously stored faxes, is provided.

Figure 2:
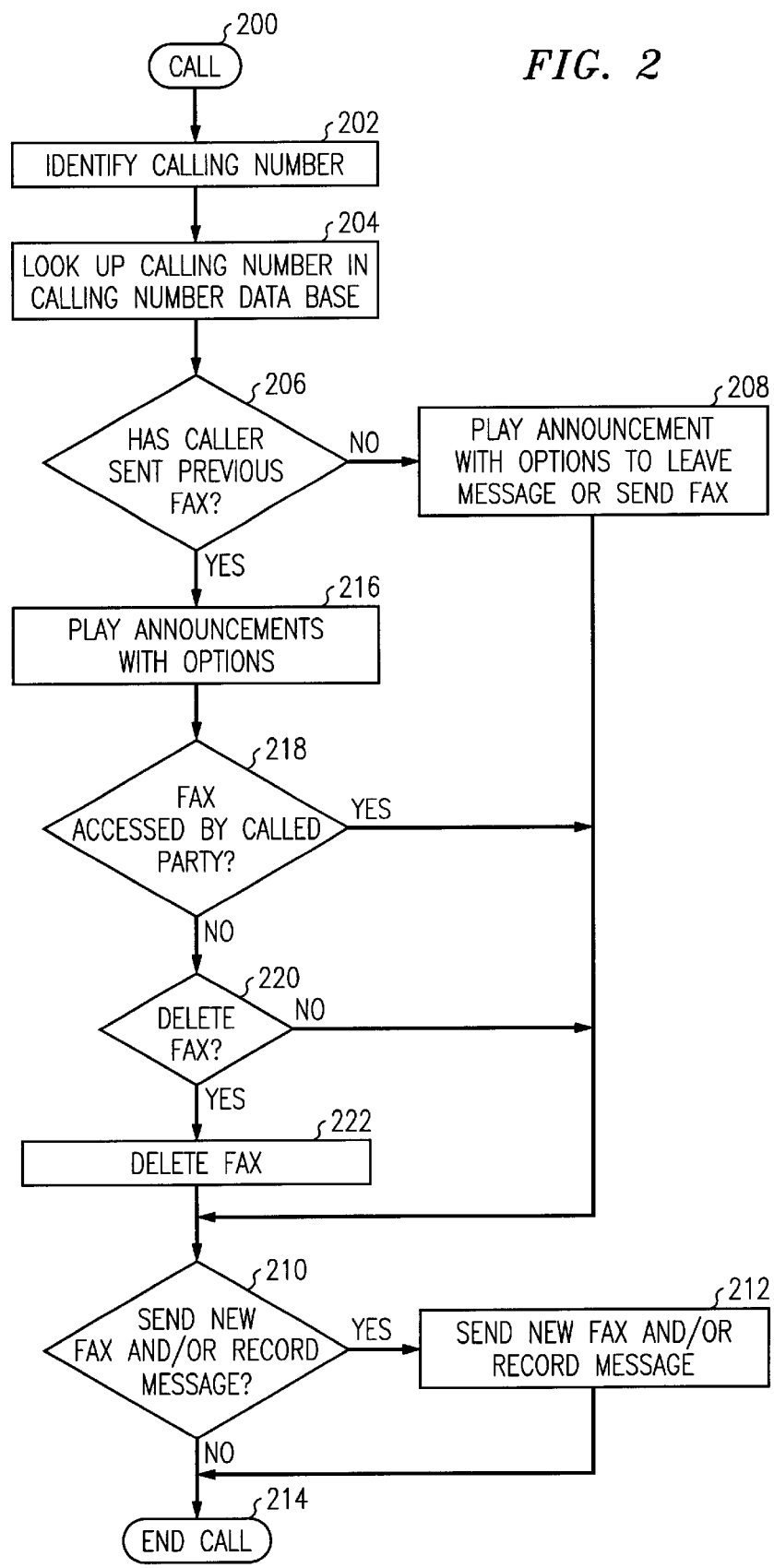
FIG. 2 is a flowchart of operation of this invention in the voice mail system of FIG. 1.

Turning now to FIG. 2, one exemplary flow of operations as performed in processor 18 of voice mail server 16 is shown. A call arrives at circle 200, and, at action box 202, the calling number is identified. In action box 204, the processor performs a lookup in the calling number database 24. In decision diamond 206, a determination is made if the caller has previously left a fax by a match being found in the calling number database. If the caller has not previously left a message, then, in action box 208, an announcement is played with the option to leave a message or send a fax. A determination is made in decision diamond 210 whether the calling party wants to record a new message or a fax and, if so, a message is recorded in action box 214. If not, the call ends in circle 214.

If it is determined in decision diamond 206 that the caller has left one or more previous fax messages, then processing proceeds to action box 216 where an announcement with options is played. The following decision diamonds are examples of selections that a calling party could make, but is not meant to be an all-inclusive list. In decision diamond 218, a determination is made whether the message has been listened-to by the calling party. If the message has already been accessed, then there is no point in manipulating the message and call processing moves to a determination whether a new message is to be recorded in decision diamond 210.

If the fax has not been accessed in decision diamond 218, then a determination is made in decision diamond 220 if the fax is to be deleted. If so, then the fax is deleted in action box 222. Optionally, this procedure may loop back to decision diamond 218 if there is more than one message left by the calling party. Processing then moves through decision diamond 210 to determine whether the calling party wishes to leave another fax or record a message. If the calling party does desire to leave a message or fax, the message is recorded in action box 212 and call processing ends in circle 214.

It is to be understood that the above-described embodiments are merely illustrative principles of the invention, and that many variations may be devised by those skilled in the art without departing from the scope of this invention. For example, the principles of this invention may also apply to wireless voice mail systems. Additionally, a stand-alone fax machine may be modified by one skilled in the art to operate according to the principles of this invention. It is, therefore, intended that such variations be included within the scope of the following claims.

What is claimed is:

1. A method for use in a voice message system comprising the steps of:

in a voice messaging system for serving a called party, receiving an incoming call from a calling party;

comparing a received calling line identification with stored calling line identifications, corresponding to stored fax messages;

determining whether the voice messaging system is currently storing one or more fax messages previously left by the calling party for the called party based on the comparing;

presenting the calling party with a menu of actions for selectively deleting a stored fax message if the calling party previously left a fax message; and deleting a fax message currently stored and previously left by the calling party according to instructions from the calling party.

2. A method in accordance with claim 1 wherein a calling line identification of the calling party is delivered with the call, and wherein the step of determining whether the calling party previously left one or more faxes comprises comparing the calling line identification with a data base of calling line identifications associated with stored faxes.

3. A method in accordance with claim 1, further including the step of informing the calling party whether the one or more fax messages have been accessed.

4. A method in accordance with claim 1 wherein the step of changing one or more messages comprises deleting one or more faxes.

5. A method in accordance with claim 1, further including the step of recording an additional fax message for the called party.

6. A voice mail apparatus comprising:

a recording device for recording and playing back faxes;

a calling line identification memory device configured to store a calling line identification associated with each recorded fax;

means connected to said recording device and said calling line identification memory device configured to receive a calling line identification for determining whether the received calling line identification is stored in the calling line identification memory device by comparing the received and stored calling line identifications;

means responsive to the determining means for determining that the received calling line identification is stored, for presenting the calling party with a menu of options for selectively deleting a previously recorded fax; and means responsive to input from the calling party for deleting the previously recorded fax.

7. An apparatus according to claim 6, further including a DTMF (Dual Tone Multi-Frequency) detector connected to the means for deleting the previously recorded message configured to interpret DTMF input from the calling party.

* * * * *